(12) United States Patent
Sugaya (10) Patent No.: US 9,357,333 B2
(45) Date of Patent: May 31, 2016

(54) MOBILE TERMINAL, APPLICATION SELECTION SERVER, APPLICATION INSTALLATION METHOD, AND MOBILE TERMINAL PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 0 days.

(21) Appl. No.: 14/452,677

(22) Filed: Aug. 6, 2014

(65) Prior Publication Data

US 2015/0281870 A1    Oct. 1, 2015

(30) Foreign Application Priority Data

Mar. 26, 2014  (JP) ................. 2014-063466

(51) Int. Cl.
  *H04W 4/00* (2009.01)
  *H04W 4/02* (2009.01)

(52) U.S. Cl.
  CPC .............. *H04W 4/003* (2013.01); *H04W 4/021* (2013.01)

(58) Field of Classification Search
  CPC ....... H04W 4/003; H04W 4/021; H04W 4/02; H04W 4/001; H04W 4/028; H04W 4/18; H04W 4/206; H04W 88/06; H04W 12/02; H04W 28/16; H04W 4/025; H04W 4/12; H04W 4/16; H04W 12/00; H04W 12/04; H04W 12/06
  See application file for complete search history.

(56) References Cited

U.S. PATENT DOCUMENTS

| 8,958,822 | B2 * | 2/2015 | Liang ...................... H04W 4/02 340/988 |
| 9,128,956 | B2 * | 9/2015 | Salmre .............. G06F 17/30241 |
| 2012/0021774 | A1 * | 1/2012 | Mehta ................. G06Q 30/0282 455/456.3 |
| 2013/0205196 | A1 * | 8/2013 | Han ....................... H04W 4/001 715/234 |
| 2014/0141809 | A1 * | 5/2014 | Chin ........................ H04L 67/34 455/456.3 |
| 2014/0172891 | A1 * | 6/2014 | Amidei ............... G06F 17/3087 707/758 |
| 2014/0267770 | A1 * | 9/2014 | Gervautz ........... H04N 5/23296 348/169 |
| 2015/0192658 | A1 * | 7/2015 | Ullah ........................ G01S 5/04 455/456.1 |
| 2015/0237457 | A1 * | 8/2015 | Yu .......................... H04W 4/003 455/558 |
| 2016/0014546 | A1 * | 1/2016 | Huh ........................ H04W 4/02 455/41.2 |

FOREIGN PATENT DOCUMENTS

JP      2013-073420      4/2013

* cited by examiner

*Primary Examiner* — Hirdepal Singh
(74) *Attorney, Agent, or Firm* — Lex IP Meister, PLLC (57) ABSTRACT

A location information based application is installed on a mobile terminal. The mobile terminal 10 is communicatively connected to an application selection server 200 for selecting an application and an application server 300 for transmitting an application. The mobile terminal 10 receives an activation of a predetermined portal application from a user, identifies a current location of the mobile terminal, transmits the identified location to application selection server 200 in response to the activation of the portal application, receives from the application selection server 200 a data about an application selected by the application selection server 200, determines whether the selected application has been installed on the mobile terminal 10 in response to the data about the selected application, and installs the selected application by accessing the application server 300 when it is determined that the selected application has not been installed on the mobile terminal.

7 Claims, 7 Drawing Sheets

<APPLICATION RELATED LOCATION TABLE>

| ACCESS POINT IP | LOCATION INFORMATION | APP NAME | APP ID | WEIGHT |
|---|---|---|---|---|
| 200.168.9.* | (35.681382,139.766084) | SAGA MUSEUM APP | SB00001 | 3 |
| - | (35.657281,139.703264) | SAGA STATION INFO APP | SS00012 | 2 |
| 200.190.210.12 | (35.823435,139.805574) | HAMBURGER SHOP APP | MD00192 | 1 |
| ... | ... | ... | ... | ... |

MOBILE TERMINAL, APPLICATION SELECTION SERVER, APPLICATION INSTALLATION METHOD, AND MOBILE TERMINAL PROGRAM

CROSS-REFERENCE TO RELATED APPLICATION

The present application claims priority to and the benefit of Japanese Patent Application No. 2014-063466 filed on Mar. 26, 2014, the entire contents of which are incorporated herein by reference.

BACKGROUND (a) Field

The present invention generally relates to a mobile terminal, an application selection server, an application installation method, and a mobile terminal program for installing an application based on location information.

(b) Description of the Related Art

In recent years, with spread of high-performance mobile terminals called smartphones or tablets, it is explosively increased to use contents as users move. Further, as native applications that can utilize expressive or model-specific features compared with traditional websites are used often.

In particular, various entities provide employees or customers with various applications for the purpose of promotion and convenience. On the other hand, because the various applications are provided, it is difficult for the users to select information that they really need.

To solve this problem, a recommendation system has been developed. The recommendation system performs a recommendation using the user's attributes without performing pre-registration for the user by using acquired face image of the user.

For example, Japanese Patent Publication No. 2013-073420 discloses that a mobile terminal acquires a user's face image and extracts a feature quantity from the acquired user's face image. Then, the mobile terminal transmits the extracted feature quantity to a recommendation server. The recommendation server receives the feature quantity from the mobile terminal, stores at least a plurality of feature quantities, performs matching processing of the received feature quantity with the stored feature quantities, recommends an application or the like on the basis of the matching result, and transmits the recommendation result to the mobile terminal. The mobile terminal receives the recommendation result from the recommendation server, and displays the received recommendation result.

However, since the recommendation is performed based on individual information such as the face in the above reference, it is impossible to perform the recommendation based on environment information such as location or time zone.

SUMMARY

An aspect of the present invention is directed to provide a mobile terminal, an application selection server, an application installation method, and a mobile terminal program for identifying a current location of a user from usage information of a GPS (Global Positioning System) or a public wireless LAN (Local Area Network) and then allowing a server to select and install an application that is associated with the identified location such that the user can simply obtain a required application.

The present invention may provide the following aspects.

In a first aspect of the present invention, a mobile terminal communicatively connected to an application selection server for selecting an application and an application server for transmitting an application is provided. The mobile terminal includes a portal application reception module configured to receive an activation of a predetermined portal application from a user, a location identification module configured to identify a current location of the mobile terminal, a location information transmission module configured to transmit the identified location to application selection server in response to the activation of the portal application, an application data reception module configured to receive from the application selection server a data about an application selected by the application selection server, an installation determination module configured to determine whether the selected application has been installed on the mobile terminal in response to the data about the selected application, and an installation module configured to install the selected application by accessing the application server when it is determined that the selected application has not been installed on the mobile terminal.

According to the first aspect of the present invention, a mobile terminal, which is communicatively connected to an application selection server for selecting an application and an application server for transmitting an application, can receive an activation of a predetermined portal application from a user, identify a current location of the mobile terminal, transmit the identified location to application selection server in response to the activation of the portal application, receive from the application selection server a data about an application selected by the application selection server, determine whether the selected application has been installed on the mobile terminal in response to the data about the selected application, and install the selected application by accessing the application server when it is determined that the selected application has not been installed on the mobile terminal.

The first aspect of the present invention relates to the mobile terminal, but may be applicable to an application installation method and a program for a mobile terminal in the same manner.

In a second aspect of the present invention, when identifying the current location of the mobile terminal, the mobile terminal that identifies the current location of the mobile terminal by using an SSID (Service Set IDentifier) or IP (Internet Protocol) address of a wireless access point to which the mobile terminal is connected is provided.

According to the second aspect of the present invention, the mobile terminal according to the first aspect can identify the current location of the mobile terminal by using an SSID or IP address of a wireless access point to which the mobile terminal is connected when identifying the current location of the mobile terminal.

In a third aspect of the present invention, an application selection server communicatively connected to a mobile terminal is provided. The application selection server includes a storage unit including an application related location database in which data related with applications, location information, and weights of the applications are associated with each other and are stored, a location information reception module configured to receive a current location of the mobile terminal from the mobile terminal, an application extraction module configured to extract from an application-related location database data about applications that are associated with location information within a predetermined range based on the received current location, an application selection module configured to select data about an application having a largest weight from among the data about applications, and a selected application data transmission module configured to transmit the data about selected application to the mobile terminal.

According to the third aspect of the present invention, an application selection server communicatively connected to a mobile terminal can have a storage unit including an application related location database in which data related with applications, location information, and weights of the applications are associated with each other and are stored, receive a current location of the mobile terminal from the mobile terminal, extract data about applications that are associated with location information within a predetermined range from an application-related location database based on the received current location, select data about an application having a largest weight from among the data about applications, and transmit the data about selected application to the mobile terminal.

In a fourth aspect of the present invention, in selecting data about an application, an application selection server in which the weight is represented as a sum or a product of a function of a distance between the current location of the mobile terminal and location information associated with the data about applications and a constant predefined for each of the applications is provided.

According to the fourth aspect of the present invention, an application selection server according to the third aspect can, in selecting data about an application, represent the weight as a sum or a product of a function of a distance between the current location of the mobile terminal and location information associated with the data about applications and a constant predefined for each of the applications.

In a fifth aspect of the present invention, an application installation method executed by a mobile terminal communicatively connected to an application selection server for selecting an application and an application server for transmitting an application is provided. The application installation method includes receiving an activation of a predetermined portal application from a user, identifying a current location of the mobile terminal, transmitting the identified location to application selection server in response to the activation of the portal application, receiving from the application selection server a data about an application selected by the application selection server, determining whether the selected application has been installed on the mobile terminal in response to the data about the selected application, and installing the selected application by accessing the application server when it is determined that the selected application has not been installed on the mobile terminal.

In a sixth aspect of the present invention, a program for executing an application installation method on a mobile terminal communicatively connected to an application selection server for selecting an application and an application server for transmitting an application or a recording medium storing the program is provided. The application installation method includes receiving an activation of a predetermined portal application from a user, identifying a current location of the mobile terminal, transmitting the identified location to application selection server in response to the activation of the portal application, receiving from the application selection server a data about an application selected by the application selection server, determining whether the selected application has been installed on the mobile terminal in response to the data about the selected application, and installing the selected application by accessing the application server when it is determined that the selected application has not been installed on the mobile terminal.

Aspects of the present invention can provide a mobile terminal, an application selection server, an application installation method, and a mobile terminal program for identifying a current location of a user from usage information of a GPS or a public wireless LAN and then allowing a server to select and install an application that is associated with the identified location such that the user can simply obtain a required application.

DETAILED DESCRIPTION

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Overview of Application Installation System 1

Figure 1:
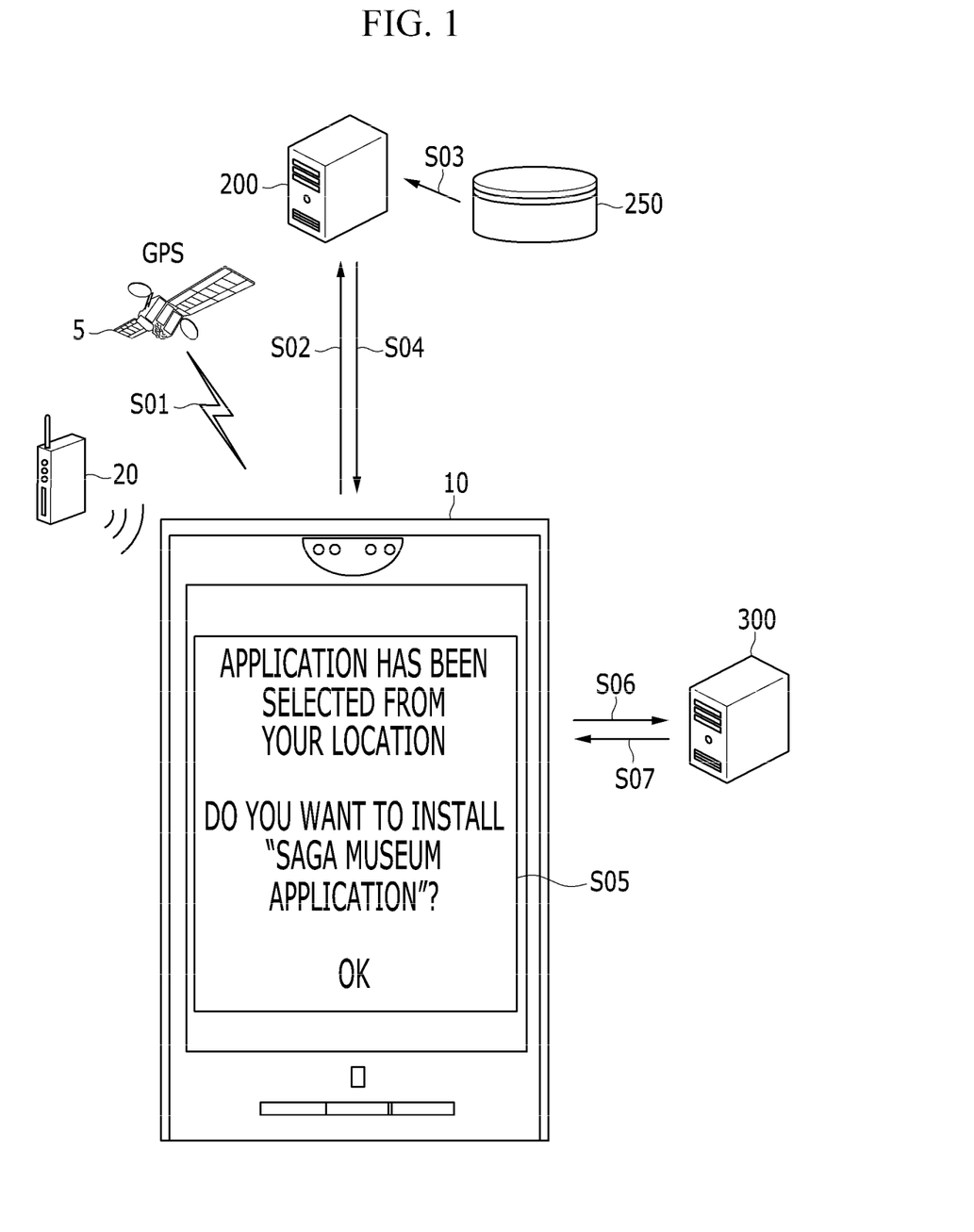
FIG. 1 is a diagram for explaining an overview of an application installation system 1 according to an embodiment of the present invention.

FIG. 1 is a diagram for explaining an overview of an application installation system 1 according to an embodiment of the present invention. The application installation system 1 includes a mobile terminal 10, an application selection server 200, and an application server 300.

In the application installation system 1, the mobile terminal 10 starts up a portal application in preparation for performing the following processing. The portal application may be a so-called web application which provides contents through an internet browser. Next, the mobile terminal 10 identifies a current location of the mobile terminal 10 by using latitude and longitude information acquired by a GPS (Global Positioning System) system 5, connection information to a public wireless LAN (Location Area Network) connection point 20, and communication information with a base station (Step S01). Then, the mobile terminal 10 sends location information indicating the identified location to the application selection server 200 (Step S02).

The application selection server 200 that has received the location information extracts from an application related location database 250 an application or applications associated with location information that is within a predetermined range from the received location information (Step S03). In general, the predetermined range may be a circular area whose radius is less than a predetermined length. Alternatively, the predetermined range may be a rectangular area or the other shape area.

Next, the application selection server 200 selects the application having the highest weight with reference to weights which are predefined for the extracted applications, and transmits data about the selected application to the mobile terminal 10 (Step S04).

The data about the application may be an installation data (i.e., an installation file) of the application. Alternatively, the data about the application may be information for installing the application due to constraints of the mobile terminal 10. In other words, in the case that a provider of the terminal manages publications under a certain examination standard, it is difficult for the application selection server 200 to directly provide the installation data of the application. Therefore, the application selection server 200 provides meta-information for installing the application through the application server 300.

On receiving the data about the selected application, the mobile terminal 10 displays the data about the selected application, and determines whether the application represented by the data has been installed or not (Step S05).

If the selected application has not been installed, the mobile terminal 10 transmits to the application server 300 data about the selected application, in particular an identifier of the selected application, in order to install the selected application (Step S06). The application server 300 transmits an installation data of the selected application to the mobile terminal 10 in response to the request such that the mobile terminal 10 can install the selected application (Step S07).

The above is the overview of the application installation system 1.

System Configuration of Application Installation System 1

Figure 2:
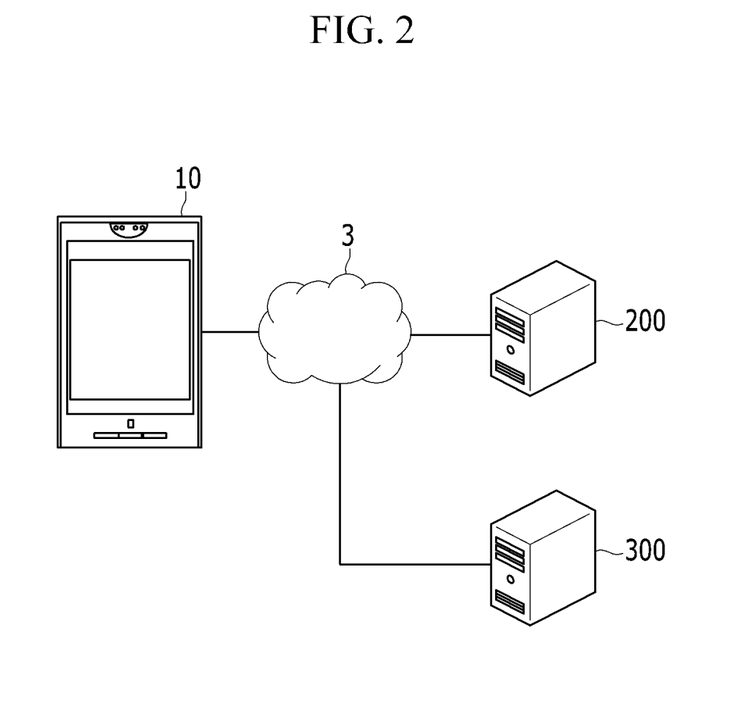
FIG. 2 is a system block diagram of an application installation system 1 according to an embodiment of the present invention.

FIG. 2 is a system block diagram of an application installation system 1 according to an embodiment of the present invention. The application installation system 1 includes a mobile terminal 10, an application selection server 200, an application server 300, and a public network 3 (for example, an internet network, or the third generation or fourth generation communication network).

The mobile terminal 10 has functions to be described below, and can perform data communication. The mobile terminal 10 is an electric appliance for home or commercial use that can be used while a user moves with carrying it. For example, the mobile terminal 10 may be a mobile phone, a portable information terminal, or a home information appliance such as a smartphone, a laptop PC (Personal Computer), a tablet terminal, a netbook terminal, a slate terminal, an electronic dictionary terminal, a portable music player, or the like.

The application selection server 200 has functions to be described below, and is a server for selecting an application according to location information of the mobile terminal 10.

The application server 300 may be a typical application distribution server for installing an application on the mobile terminal 10.

Description of Each Function

Figure 3:
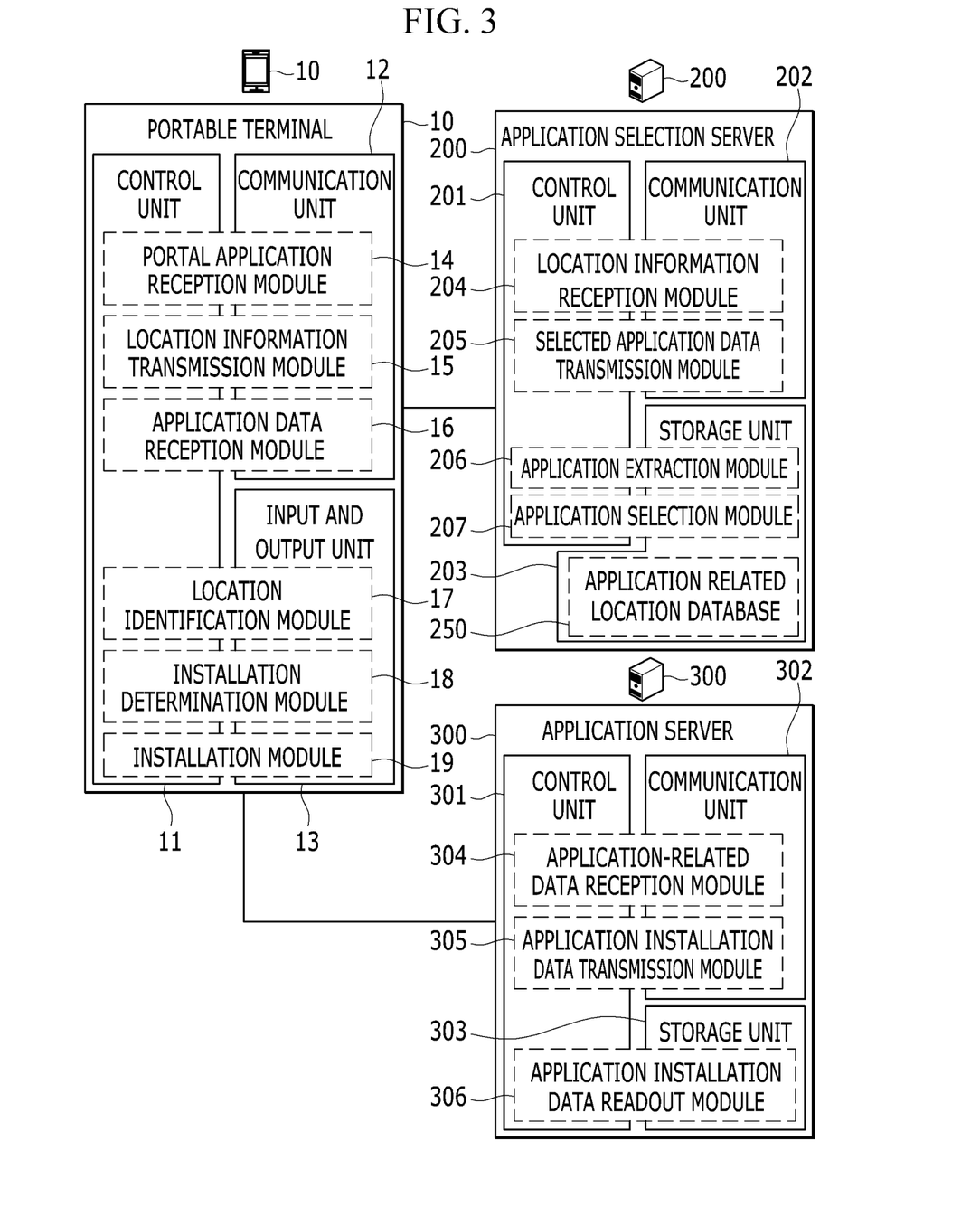
FIG. 3 is a function block diagram of a mobile terminal 10, an application selection server 200, and an application server 300.

Configuration of each device is described with reference to FIG. 3.

The mobile terminal 10 includes a Central Processing Unit (CPU), a Random Access Memory (RAM), a Read Only Memory (ROM) and the like as a controller 11. The mobile terminal 10 further includes, as a communication unit 12, a device for enabling a communication with other device, for example a WiFi (Wireless Fidelity) enabled device based on IEEE 802.11.

The mobile terminal 10 further includes, as an input and output unit 13, a display unit for displaying data and images controlled by the control unit 11, a touch panel, a keyboard, or a mouse for receiving an input from a user, and a device for acquiring location information such as a GPS.

In the mobile terminal 10, the control unit 11 reads a predetermined program, thereby realizing a portal application reception module 14, a location information transmission module 15, and an application data reception module 16, in cooperation with the communication unit 12. Further, in the mobile terminal 10, the control unit 11 reads a predetermined program, thereby realizing a location identification module 17, an installation determination module 18, and an installation module 19, in cooperation with the input and output unit 13.

Similarly to the mobile terminal 10, the application selection server 200 includes a CPU, a RAM, a ROM and the like as a control unit 201. The application selection server 200 further includes, as a communication unit 202, for example, a WiFi enabled device based on IEEE 802.11, or other appliance such as a device for enabling a connection by a wire cable, and a device for realizing a data communication with a wireless access point. Furthermore, the application selection server 200 further includes, as a storage unit 203 for storing data and files, a data storage unit according to a hard disk, a semiconductor memory, a recording medium, or a memory card. The storage unit 203 includes an application related location database 250. The wireless access point is a device to which the mobile terminal 10 is connected through the WiFi by using an SSID (Service Set IDentifier), and may be a device for enabling a connection to an external internet.

In the application selection server 200, the control unit 201 reads a predetermined program, thereby realizing a location information reception module 204 and a selected application data transmission module 205, in cooperation with the communication unit 202. Further, in the application selection server 200, the control unit 201 reads a predetermined program, thereby realizing an application extraction module 206 and an application selection module 207, in cooperation with the storage unit 203.

Similarly to the mobile terminal 10, the application server 300 includes a CPU, a RAM, a ROM and the like as a control unit 301. The application server 300 further includes, as a communication unit 302, for example, a WiFi enabled device based on IEEE 802.11, or other appliance such as a device for enabling a connection by a wire cable, and a device for realizing a data communication with a wireless access point. Further, the application server 300 further includes, as a storage unit 303 for storing data and files, a data storage unit according to a hard disk, a semiconductor memory, a recording medium, or a memory card.

In the application server 300, the control unit 301 reads a predetermined program, thereby realizing an application-related data reception module 304, an application installation data transmission module 305, in cooperation with the communication unit 302. Further, in the application server 300, the control unit 301 reads a predetermined program, realizing an application installation data readout module 306 in cooperation with the storage unit 303.

Application Installation Process

Figure 4:
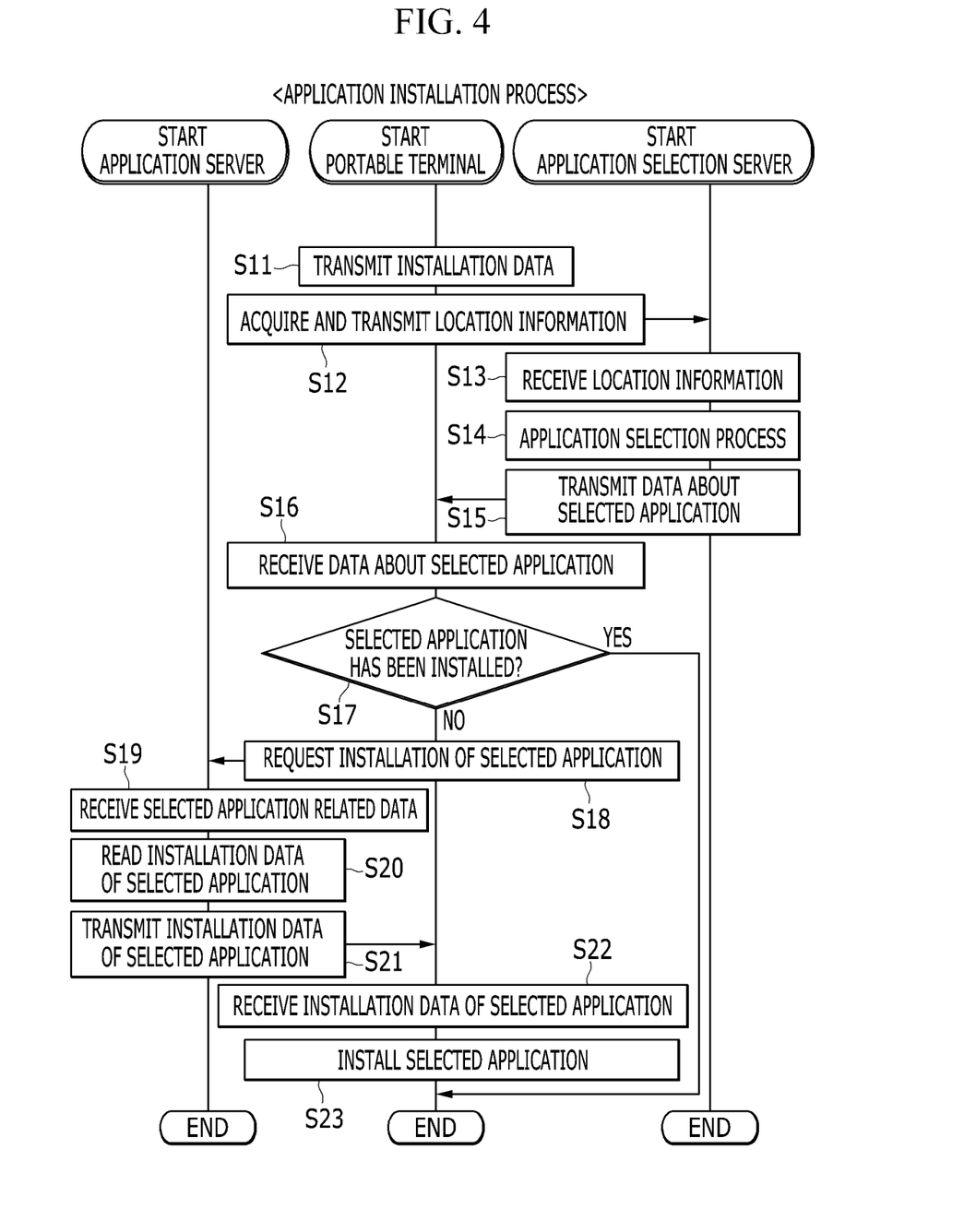
FIG. 4 is a flowchart of an application installation process executed by a mobile terminal 10, an application selection server 200, and an application server 300.

FIG. 4 is a flowchart of an application installation process executed by a mobile terminal 10, an application selection server 200, and an application server 300. Processes executed by the modules of each device described above are described in conjunction with the present procedure.

First, the portal application reception module 14 of the mobile terminal 10 activates (starts up) a portal application in preparation for performing the following processes (Step S11). The portal application may be a so-called web application which provides contents through an internet browser. A subsequent exchange of location information with the application selection server 200 is basically performed via the portal application.

The location identification module 17 identifies a current location of the mobile terminal 10 and acquires location information by using a location information acquisition device such as a GPS or the like, or connection information of a public wireless LAN. An IP (Internet Protocol) address of a wireless access point and an SSID (Service Set IDentifier) may be used as the connection information of the public wireless LAN. The location information transmission module 15 of the mobile terminal 10 transmits the acquired location information to the application selection server 200 (Step S12).

The location information reception module 204 of the application selection server 200 receives the location information (Step S13). The application selection server 200 executes an application selection process to select an application to be provided to the mobile terminal 10 from the received location information (Step S14).

Application Selection Process

Figure 5:
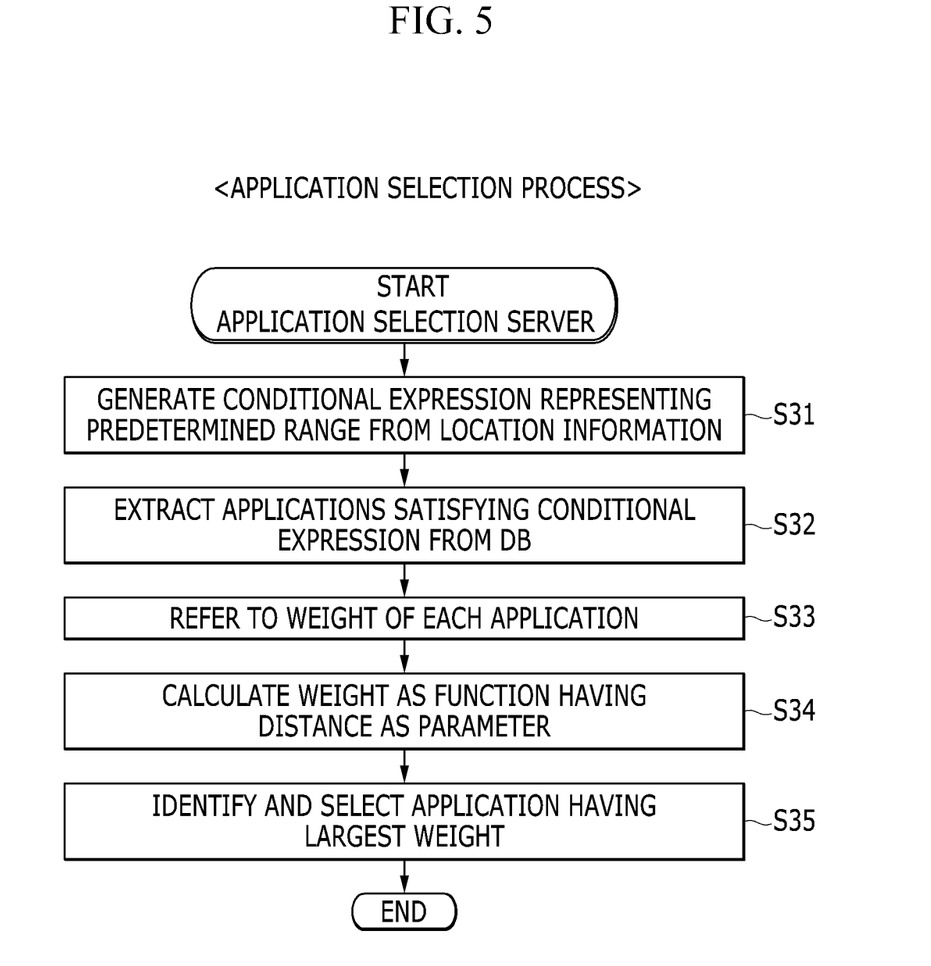
FIG. 5 is a flowchart of an application selection process executed by an application selection server 200.

FIG. 5 is a flowchart of an application selection process executed by an application selection server 200. Processes executed by the modules of each device described above are described in conjunction with the present process. Selected applications may be applications that are respectively provided by different operators, or the operators may be not the same as an operator providing a portal application.

First, the application extraction module 206 of the application selection server 200 generates a conditional expression for representing whether or not to be included within a predetermined range on the basis of the received location information (Step S31). For example, after converting the received location information if a format of the received location information is different from a format used in an application-related location database 250, the application extraction module 206 generates a function having location information associated with an application as a variable and representing a distance between the received location information and location information associated with the application. Next, the application extraction module 206 converts the conditional expression indicating that a value of the function is less than or equal to a predetermined value into an expression which can be interpreted by a database program.

Subsequently, the application extraction module 206 extracts all applications satisfying the condition from the application-related location database 250 by using the condition expression (Step S32).

Figure 7:
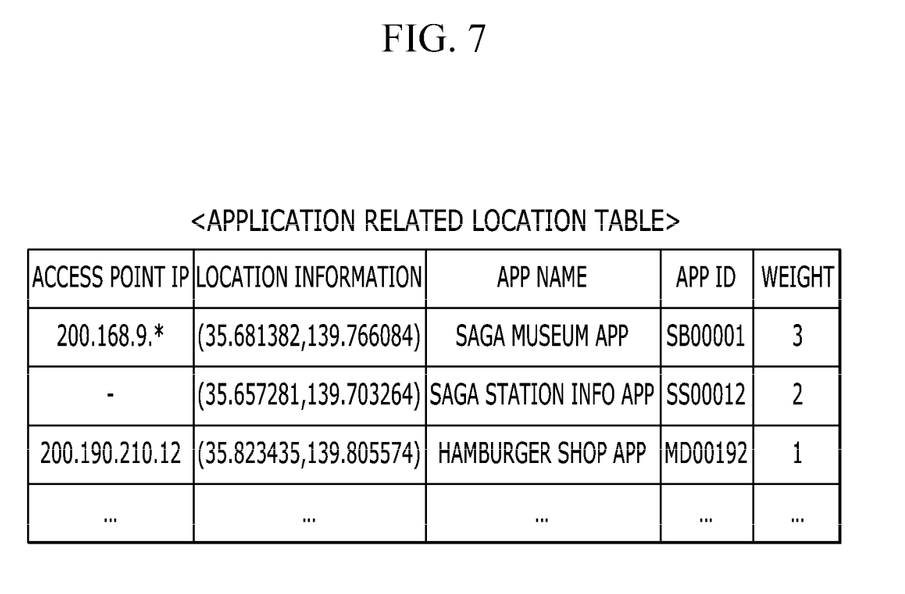
FIG. 7 shows an example of an application-related location table of an application-related location database 250.

FIG. 7 shows an example of an application-related location table of an application-related location database 250. The application-related location table may be set by an administrator in advance. In the application-related location table, application-related data including application IDs (IDentifiers), location information, and weights are associated with each other and are stored. The weight may be a constant, or may be set as a function that has the distance as a parameter. A value or format of the weight may be different for each application. The "*" in the access point IP represents any value from 1 to 255, and is typically represented by a subnet mask.

Next, the application selection module 207 of the application selection server 200 refers to the weight for the extracted application (Step S33). The application selection module 207 may use the weight itself if the weight is constant. If the weight is the function that has the distance as the parameter, the application selection module 207 may calculate a sum or a product of a function value determined from the current location information and a weight (constant) of the application itself, thereby calculating the weight for each application (step S34).

Finally, the application selection module 207 identifies an application that has the largest weight from among the extracted applications, and selects the identified application (Step S35). The above is a procedure of the application selection process.

Returning to the application installation process, the selected application data transmission module 205 of the application selection server 200 transmits data about the selected application to the mobile terminal 10 (Step S15). The application data reception module 16 of the mobile terminal 10 receives the data about the selected application (Step S16). The installation determination module 18 determines whether an application indicated by the received data about the selected application has been already installed on the mobile terminal 10 (Step S17).

Here, if the application has been already installed (Step S17: YES), the application installation process is terminated without performing the following process. On the other hand, if the application has not been installed (Step S17: NO), the following process is performed to continue with the installation of the application. Whether the application has been installed or not may be determined by referring to system information such as a registry or by the retrieval of a file name or content.

Figure 6:
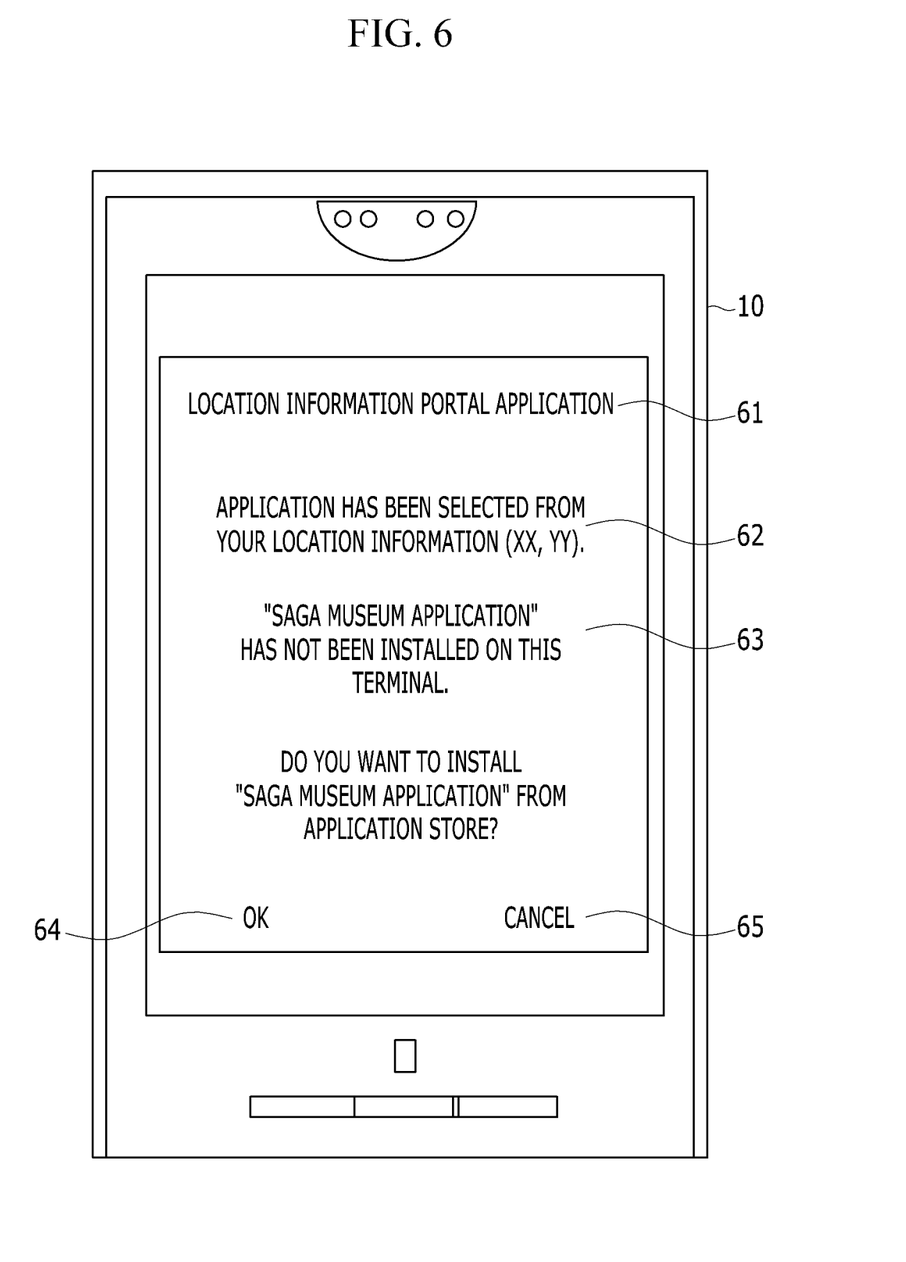
FIG. 6 shows an example of a display unit of a mobile terminal 10 for displaying a received data about an application.

FIG. 6 shows an example of a display unit of a mobile terminal 10 for displaying received data about an application. An application name 61 of a portal application, location information 62, and information 63 about the application are displayed on a screen. The example shows the case that the application has not been installed. The installation is started by pressing an OK button 64, and is canceled by pressing a cancel button 65.

In order to install the application, the installation module 19 of the mobile terminal 10 requests an installation of the selected application to the application server 300 (Step S18). In this case, the selected application related data, in particular an identifier such as an application ID is transmitted as a parameter of the request.

When the application-related data transmission module 304 of the application server 300 receives the application related data as the parameter of the request (Step S19), the application installation data readout module 306 reads an installation data of the application from a storage unit (Step S20), and the application installation data transmission module 305 transmits the installation data to the mobile terminal 10 (Step S21).

Upon receiving the installation data from the application server 300 (Step S22), the installation module 19 of the mobile terminal 10 interprets the installation data and executes the installation process, thereby installing the application onto the mobile terminal 10 (Step S23).

Through the above process, the mobile terminal 10 can install the location information based application. The above is a procedure of the application installation process executed the mobile terminal 10, the application selecting server 200, and the application server 300.

The above-described means and functions are realized by reading and executing a predetermined program by a computer (including a CPU, an information processing apparatus, and various terminals). The program is recorded in a (non-transitory) computer-readable recording medium, for example, a flexible disk, a CD (e.g., a CD-ROM or the like) and a DVD (e.g., a DVD-ROM, a DVD-RAM, or the like). In this case, the program is read from the recording medium by a computer and transmitted to an internal storage unit or an external storage unit to be stored and executed. Further, the program may be pre-stored in a storage unit (recording medium) such as a magnetic disk, an optical disk, or an optical magnetic disk and transmitted from the recording medium to a computer through a communications line.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A mobile terminal communicatively connected to an application selection server for selecting an application and an application server for transmitting an application, the mobile terminal comprising:
   a portal application reception module configured to receive an activation of a predetermined portal application from a user;
   a location identification module configured to identify a current location of the mobile terminal;
   a location information transmission module configured to transmit the identified location to application selection server in response to the activation of the portal application;
   an application data reception module configured to receive from the application selection server data about an application selected by the application selection server, the data about the application including information for installing the application;
   an installation determination module configured to determine whether the selected application has been installed on the mobile terminal in response to the data about the selected application; and
   an installation module configured to install the selected application by accessing the application server and receiving installation data of the selected application from the application server based on the data about the application when it is determined that the selected application has not been installed on the mobile terminal,
   wherein the data about the selected application is data about an application having a largest weight from among data about applications that are associated with location information within a predetermined range based on the identified location, and
   wherein a weight for each of the applications is represented as a sum or a product of a function value of a distance between the current location of the mobile terminal and location information associated with the data about applications and a constant predefined for each of the applications.

2. The mobile terminal of claim 1, wherein, when identifying the current location of the mobile terminal, the location identification module identifies the current location of the mobile terminal by using an SSID (Service Set IDentifier) or IP (Internet Protocol) address of a wireless access point to which the mobile terminal is connected.

3. An application selection server communicatively connected to a mobile terminal, the application selection server comprising:
   a storage unit including an application related location database in which data related with applications, location information, and weights of the applications are associated with each other and are stored;
   a location information reception module configured to receive a current location of the mobile terminal from the mobile terminal;
   an application extraction module configured to extract from an application-related location database data about applications that are associated with location information within a predetermined range based on the received current location;
   an application selection module configured to select data about an application having a largest weight from among the data about applications; and
   a selected application data transmission module configured to transmit the data about selected application to the mobile terminal, the data about the selected application including information for installing the selected application and installation data of the selected application being provided to the mobile terminal from an application server based on the data bout the selected application,
   wherein in selecting data about an application, the weight is represented as a sum or a product of a function value of a distance between the current location of the mobile terminal and location information associated with the data about applications and a constant predefined for each of the applications.

4. An application installation method executed by a mobile terminal communicatively connected to an application selection server for selecting an application and an application server for transmitting an application, the application installation method comprising:
   receiving an activation of a predetermined portal application from a user;
   identifying a current location of the mobile terminal;
   transmitting the identified location to application selection server in response to the activation of the portal application;
   receiving from the application selection server data about an application selected by the application selection server, the data about the application including information for installing the application;
   determining whether the selected application has been installed on the mobile terminal in response to the data about the selected application; and
   installing the selected application by accessing the application server and receiving installation data of the selected application form the application server based on the data about the application when it is determined that the selected application has not been installed on the mobile terminal,
   wherein the data about the selected application is data about an application having a largest weight from among data about applications that are associated with location information within a predetermined range based on the identified location, and
   wherein a weight for each of the applications is represented as a sum or a product of a function value of a distance between the current location of the mobile terminal and location information associated with the data about applications and a constant predefined for each of the applications.

5. The application installation method of claim 4, wherein identifying the current location of the mobile terminal includes identifying the current location of the mobile terminal by using an SSID (Service Set IDentifier) or IP (Internet Protocol) address of a wireless access point to which the mobile terminal is connected.

6. A non-transitory computer-readable recording medium that stores a program for executing an application installation method on a mobile terminal communicatively connected to an application selection server for selecting an application and an application server for transmitting an application, the application installation method comprising:
- receiving an activation of a predetermined portal application from a user;
- identifying a current location of the mobile terminal;
- transmitting the identified location to application selection server in response to the activation of the portal application;
- receiving from the application selection server a data about an application selected by the application selection server, the data about the application including information for installing the application;
- determining whether the selected application has been installed on the mobile terminal in response to the data about the selected application; and
- installing the selected application by accessing the application server and receiving installation data of the selected application from the application server based on the data about the application when it is determined that the selected application has not been installed on the mobile terminal,
- wherein the data about the selected application is data about an application having a largest weight from among data about applications that are associated with location information within a predetermined range based on the identified location, and
- wherein a weight for each of the applications is represented as a sum or a product of a function value of a distance between the current location of the mobile terminal and location information associated with the data about applications and a constant predefined for each of the applications.

7. The non-transitory computer-readable recording medium of claim 6, wherein identifying the current location of the mobile terminal includes identifying the current location of the mobile terminal by using an SSID (Service Set IDentifier) or IP (Internet Protocol) address of a wireless access point to which the mobile terminal is connected.

* * * * *